United States Patent
Forsman et al.

(10) Patent No.: US 10,708,819 B2
(45) Date of Patent: Jul. 7, 2020

(54) BACK-PRESSURE CONTROL IN A TELECOMMUNICATIONS NETWORK

(71) Applicant: Telefonaktiebolaget LM Ericsson (publ), Stockholm (SE)

(72) Inventors: Mats Forsman, Rönninge (SE); Tomas Thyni, Järfälla (SE); Annikki Welin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/079,540

(22) PCT Filed: Feb. 25, 2016

(86) PCT No.: PCT/SE2016/050145
§ 371 (c)(1),
(2) Date: Aug. 23, 2018

(87) PCT Pub. No.: WO2017/146621
PCT Pub. Date: Aug. 31, 2017

(65) Prior Publication Data
US 2019/0059023 A1    Feb. 21, 2019

(51) Int. Cl.
*H04W 28/14* (2009.01)
*H04L 12/851* (2013.01)
(Continued)

(52) U.S. Cl.
CPC ............. *H04W 28/14* (2013.01); *H04L 47/11* (2013.01); *H04L 47/2483* (2013.01);
(Continued)

(58) Field of Classification Search
CPC ......... H04L 47/10; H04L 47/11; H04L 47/12; H04L 47/17; H04L 47/18; H04L 47/26;
(Continued)

(56) References Cited

U.S. PATENT DOCUMENTS

| 5,787,071 A | 7/1998 | Basso et al. |
| 8,411,561 B2 | 4/2013 | Schliwa-Bertling et al. |

(Continued)

FOREIGN PATENT DOCUMENTS

| WO | 2017/146621 A1 | 8/2017 |
| WO | 2017146620 A1 | 8/2017 |

OTHER PUBLICATIONS

Dreibholz T., "An IPv4 Flowlabel Option—draft-dreibholz-ipv4-flowlabel-22.txt," Network Working Group, Internet Draft, Simula Research Laboratory, Jul. 5, 2015, 8 pages.
(Continued)

*Primary Examiner* — Christopher M Crutchfield
(74) *Attorney, Agent, or Firm* — NDWE LLP

(57) ABSTRACT

Back-pressure control in a telecommunications network, in which a method of back-pressure control in a transport network is provided. A buffer state of a buffer is monitored. A condition indicative of back-pressure is also determined in response to a change of the buffer state passing a predetermined limit. In response to determining the condition indicative of back-pressure, a back-pressure notification message is created and, subsequently, transmitted to at least one second network node.

15 Claims, 12 Drawing Sheets

(51) Int. Cl.
*H04L 12/825* (2013.01)
*H04L 12/801* (2013.01)
*H04L 12/835* (2013.01)
*H04L 12/931* (2013.01)
*H04W 28/02* (2009.01)

(52) U.S. Cl.
CPC ............ *H04L 47/26* (2013.01); *H04L 47/266* (2013.01); *H04L 47/30* (2013.01); *H04L 49/506* (2013.01); *H04W 28/0289* (2013.01)

(58) Field of Classification Search
CPC ..... H04L 47/29; H04L 47/263; H04L 47/266; H04L 49/506; H04W 28/12
See application file for complete search history.

(56) References Cited

U.S. PATENT DOCUMENTS

| | | | |
|---|---|---|---|
| 2005/0052994 A1 | 3/2005 | Lee | |
| 2008/0198746 A1* | 8/2008 | Kwan | H04L 47/10 370/231 |
| 2009/0052326 A1* | 2/2009 | Bergamasco | H04L 47/10 370/236 |
| 2009/0196177 A1* | 8/2009 | Teyeb | H04B 7/2606 370/231 |
| 2010/0195521 A1* | 8/2010 | Wanstedt | H04L 47/10 370/252 |
| 2011/0080892 A1* | 4/2011 | Cai | H04W 36/0033 370/331 |
| 2011/0164496 A1 | 7/2011 | Loh et al. | |
| 2011/0299389 A1 | 12/2011 | Mau et al. | |
| 2012/0327774 A1* | 12/2012 | Hernandez | H04L 47/30 370/236 |
| 2013/0155918 A1* | 6/2013 | Singh | H04W 28/06 370/310 |
| 2014/0003242 A1 | 1/2014 | Nadas et al. | |

OTHER PUBLICATIONS

IEEE Std 802.1Qau-2010, "IEEE Standard for Local and Metropolitan Area Networks—Virtual Bridged Local Area Networks, Amendment 13: Congestion Notification," Amendment to IEEE Std 802.1Q-2005, IEEE, Apr. 23, 2010, pp. 1-119.
International Preliminary Report on Patentability for Application No. PCT/SE2016/050144, dated Feb. 6, 2018, 19 pages.
International Preliminary Report on Patentability for Application No. PCT/SE2016/050145, dated Feb. 6, 2018, 23 pages.
International Search Report and Written Opinion for Application No. PCT/SE2016/050144, dated Oct. 31, 2016, 16 pages.
International Search Report and Written Opinion for Application No. PCT/SE2016/050145, dated Oct. 21, 2016, 16 pages.
Decision to grant a European patent pursuant to Article 97(1) EPC, EP App. No. 16709835.9, dated Oct. 17, 2019, 2 pages.
Decision to grant a European patent pursuant to Article 97(1) EPC, EP App. No. 16709836.7, dated Oct. 17, 2019, 2 pages.
Intention to grant for EP Application No. 16709835.9, dated Sep. 20, 2019, 90 pages.
Intention to grant, EP Application No. 16709836.7, dated Sep. 20, 2019, 120 pages.
Non-Final Office Action, U.S. Appl. No. 16/079,549, dated Aug. 22, 2019, 28 pages.

* cited by examiner

| 0 | 1 | 2 | 3 |
|---|---|---|---|
| Version | Traffic Class | *PDCP FID / PDCP-GRP-FID / PDCP-MCGRP-FID* | |
| Payload length | | Next Header | Hop Limit |
| Source Address | | | |
| Destination Address | | | |

Figure 5A

| 0 | 1 | 2 | 3 |
|---|---|---|---|
| Type | Length | | |
| | *PDCP FID / PDCP-GRP-FID / PDCP-MCGRP-FID* | | |

Figure 5B

BACK-PRESSURE CONTROL IN A TELECOMMUNICATIONS NETWORK

CROSS-REFERENCE TO RELATED APPLICATIONS

This application is a National stage of International Application No. PCT/SE2016/050145, filed Feb. 25, 2016, which is hereby incorporated by reference.

RELATED PATENT APPLICATIONS

This international patent application is related to the international patent application no. PCT/SE2016/050144, filed on Feb. 25, 2016 and entitled "CONGESTION CONTROL IN A TELECOMMUNICATIONS NETWORK".

In order to give context to this disclosure, the disclosure of the above-referenced patent application is therefore expressly incorporated herein by reference in its entirety.

TECHNICAL FIELD

The present disclosure generally relates to telecommunications and, more particularly, to control of back-pressure in a telecommunications network. More specifically, the present disclosure relates to systems, methods, nodes, and computer program for back-pressure control in a transport network. Embodiments described herein may advantageously applied after congestion has been detected and is compensated for in the telecommunications network.

BACKGROUND

It is a well-known fact that telecommunication networks utilizing resources shared between the users may experience congestion. Congestion may, for example, occur when the sum of traffic of an ingress node of the shared resource exceeds the sum of the traffic of an egress node of the same shared resource. A typical example is a router with a specific number of connections. Even if the router has processing power enough to re-route the traffic according to an estimated link throughput, a current link throughput might in fact restrict the amount of traffic that the outgoing links from the router can cope with. Hence, as a result, the buffer(s) of the router may build up and eventually overflow. The network then experiences congestion and the router may also be forced to drop data packets.

The normal behavior for any routing node is to provide a buffer(s) that can manage a certain amount of variation in input/output link capacity and hence absorb minor congestion occurrences. However, when the congestion is severe, the routing node will eventually begin to drop data packets.

Transmission Control Protocol (TCP) is a connection-oriented, congestion-controlled and reliable transport protocol. For TCP traffic, a dropped data packet will typically be detected by the sender since no acknowledgment (ACK) is received for that particular data packet and a re-transmission of the data packet will occur. Further, the TCP protocol has a built in rate adaptive mechanism which will lower the transmission bit-rate when data packet losses occur and re-transmissions occur on the Internet Protocol (IP) layer. Hence, TCP is generally speaking well suited to respond to network congestion.

SUMMARY

It is in view the above considerations and others that the embodiments of the international patent application PCT/SE2016/050144 have been made.

PCT/SE2016/050144 recognizes the fact some existing solutions for congestion control may be inadequate, especially in the next generations (e.g., 5G or beyond) of telecommunication networks. Hence, the disclosure of PCT/SE2016/050144 proposes embodiments that allow for improved congestion control.

The embodiments described in PCT/SE2016/050144 may advantageously be applied in a in a fifth or future generation telecommunications network.

PCT/SE2016/050144 therefore recognizes the fact that current studies of the fifth generation of telecommunication networks (also known as 5G) describe a midhaul as part of the Radio Access Network (RAN) architecture.

Embodiments described throughout PCT/SE2016/050144 relate to, but are not necessarily limited to, congestion control in this midhaul. The mix of different link speeds in the network may introduce rate mismatch. Furthermore, congestion may be caused by the aggregation of traffic from many sources. Additionally, or alternatively, congestion may be caused due to differences in speed between the various network links. For example, congestion may occur when the demand for network resources exceeds the available resources at some point of time in the network. As will be appreciated, too much traffic may create buffer overflow and data packet loss in the various network nodes and in the midhaul.

PCT/SE2016/050144 recognizes that existing solutions have tried to cope with similar problems in earlier generations of telecommunication networks (e.g., 2G, 3G and 4G). However, PCT/SE2016/050144 additionally recognizes that the existing solutions may in fact be inadequate for the next generations of telecommunication networks, such as 5G or beyond. For example, in the protocol layers, congestion control (also sometimes referred to as flow control herein) could be solved at respective protocol layers, such as TCP (i.e., at Layer 4). Local Area Network switches could operate at link layer and provide pause signaling mechanisms to complement end-to-end flow control. However, for the new proposed 5G architecture, none of these functions would work in an optimal manner and would typically not work at the Internet Protocol (IP) Layer (i.e., Layer 3). Hence, new congestion control mechanisms are desired.

In order to give context to the embodiments described in PCT/SE2016/050144 as well as the embodiments described throughout this disclosure, reference is now made to FIG. 1 which schematically shows an example of a midhaul architecture for a 5G RAN architecture. As can bee seen from FIG. 1, the midhaul architecture may comprise several different network nodes, such as Base Band Units (BBU), Routers, and Packet Processing Units (PPU). In the 5G RAN architecture, BBUs and PPUs may be operatively connected over the midhaul using high speed links. The transport efficiency should advantageously be high and latency is typically required to be low. As a consequence, efficient flow control and overload protection is generally important in the transport part (a.k.a. the midhaul part) of the network, i.e. in the transport network, in order to keep the transport latency and buffer usage at low, or acceptable, levels. In the distributed 5G RAN architecture, the congestion domain is typically between BBUs and PPUs.

As can be seen in FIG. 1, the 5G RAN architecture may also comprise a Radio Control Unit (RCU). The RCU may have a S1-AP interface. S1-AP is an abbreviation for S1 Application Protocol. S1-AP provides the signaling service between E-UTRAN and the evolved packet core (EPC). As can also be seen in FIG. 1, the PPU may have a S1-u interface. S1-AP and S1-u per se are known among practitioners in the art and will therefore not be further detailed herein.

In the 5G RAN architecture, the midhaul transport resources are not unlimited and this may result in overload of the midhaul at different points (e.g., network nodes such as BBUs and/or PPUs and/or Routers) in the transport network. In other words, there are many potential bottlenecks where congestion may occur.

For example, the congestion may occur between BBUs and PPUs. One potential challenge might become the many acknowledgement (ACK) and non-acknowledgement (NACK) messages that are communicated over the midhaul between the BBUs and PPUs. The present disclosure recognizes the fact that, in today's Long Term Evolution (LTE) evolved NodeB (eNB) deployment, the Radio Link Control (RLC) and Packet Data Convergence Protocol (PDCP) are co-located and any ACK and/or NACK signaling between the protocol layers is very fast. However, the split of the RLC into the BBU and the PDCP into the PPU in the 5G RAN architecture will most likely introduce latency. At the same time the new transport network (i.e., the midhaul) between the BBU and PPU may introduce uncontrolled characteristics, like latency capacity and packet dropping.

It is in view of the above considerations and others that the various embodiments disclosed in PCT/SE2016/050144 have been made. To address this, PCT/SE2016/050144 inter alia proposes a system for congestion control in the transport network. The system comprises a first network node (a.k.a. detection point) and at least one second network node (a.k.a. reaction point). The first network node monitors a buffer state of a buffer, e.g. a buffer which is integral with the first network node. Advantageously, the buffer is dynamically sampled such that the sampling rate is adjusted in dependence of the buffer state. Furthermore, the first network node determines, or otherwise detects, a condition indicative of congestion in response to a change of the buffer state exceeding a predetermined limit. In response to determining the condition indicative of congestion, the first network node creates a congestion notification message including a combination of: (1) a flow identifier and (2) back-off information. Still further, the first network node transmits the congestion notification message to at least one second network node. The at least one second network node receives this congestion notification message. Accordingly, the at least one second network node may, as a result, adjust one or more parameters on the basis of said back-off information.

The provision of buffer state monitoring, e.g., by dynamically sampling the buffer state makes it possible to improve the congestion control. The first network node creates a congestion notification message in response to determining the condition indicative of congestion. This congestion notification message is transmitted to one or several second network nodes. Based on the received congestion notification message, the one or several second network nodes may compensate for a detected congestion by adjusting one or more of their parameters based on received back-off information including e.g. suggested back-off time, back-off rate, ramp-up time. Upon adjusting one or more of its parameters, it is possible for a second network node to adaptively adjust its behavior in dependence of a condition indicative of congestion detected by any first network node in the network. This way it is, for example, possible to dynamically reduce PDCP transmissions and/or retransmissions that would otherwise occur more frequently throughout the network. As a result, the transport network will operate more efficiently. As a further consequence, the user experience will thus also be improved.

It is in view of the above considerations and others that the various embodiments described throughout this disclosure have been made. The present disclosure recognizes the fact that there may exist scenarios, or situations, were the transport network (i.e., the midhaul) may still not be utilized in an optimal manner, or may not be utilized sufficiently efficiently.

Accordingly, it is a general object of the embodiments of the present invention to allow for improved transport network efficiency. It would be particularly advantageous if the embodiments are suitable for a fifth or future generation telecommunications network. Furthermore, it would be advantageous if the solution is backwards compatible with earlier generation telecommunications networks, such as Long Term Evolution (LTE) or LTE Advanced.

In a first aspect, this disclosure concerns a method of back-pressure control in a transport network (a.k.a. midhaul). The method is performed by a first network node. The first network node may advantageously, but not necessarily, be a network node configured for a fifth or subsequent generation telecommunications network. Sometimes, the first network node may be referred to as a detection point throughout this disclosure. Sometimes a detection point may alternatively be referred to as an overload point.

A buffer state of a buffer is monitored. In some embodiments, the buffer state may be monitored by dynamically sampling the buffer such that the sampling rate is adjusted in dependence of the buffer state. For example, the buffer may be a buffer which is part of the first network node. As will be appreciated, it is not necessary that the buffer is a buffer that is part of the first network node. The buffer may alternatively be external to the first network node. Nevertheless, in advantageous embodiments the buffer is integral with the first network node.

Furthermore, a condition indicative of back-pressure is determined in response to a change of the buffer state passing a second predetermined limit. In response to determining the condition indicative of back-pressure, a back-pressure notification message is created, or otherwise generated. The back-pressure notification message includes a combination of (1) a flow identifier identifying a flow that contributes to back-pressure and (2) back-pressure compensation information indicating a suitable compensation (e.g., reduction) for the back-pressure caused by the flow associated with said flow identifier.

The back-pressure compensation information may, for example, include one or more of the following parameters: back-off rate, back-off time, ramp-up time.

In some embodiments, the flow identifier may include a Packet Data Conversion Protocol (PDCP) Flow Identification (FID). Alternatively, the flow identifier may include a PDCP Group FID. Alternatively, the flow identifier may include a PDCP Multicast Group FID. Additionally, the flow identifier may also comprise an Internet Protocol (IP) address associated with the first network node.

Still further, the back-pressure notification message is transmitted, i.e. sent, to a second network node.

In some embodiments, the buffer state may be a buffer fill level and the change of the buffer state may be a change of the buffer fill level. The method may comprise monitoring the buffer fill level and determining the condition indicative of back-pressure in response to the buffer fill level descending below the second predetermined limit.

In some embodiments, the buffer state may be a buffer emptying rate at which the buffer empties and the change of the buffer state may be a change of the buffer emptying rate. The method may comprise monitoring the buffer emptying rate at which the buffer state empties and determining the condition indicative of back-pressure in response to said buffer emptying rate exceeding the second predetermined limit.

In advantageous embodiments, the method may additionally comprise one or more of the following actions, or steps, prior to determining the condition indicative of back-pressure: determining a condition indicative of congestion in response to a change of the buffer state exceeding a first predetermined limit; in response to determining the condition indicative of congestion, creating a congestion notification message including a combination of: said flow identifier identifying a flow that contributes to congestion; and back-off indicating a suitable back-off to compensate for the congestion caused by the flow associated with said flow identifier; and transmitting the congestion notification message to the second network node.

In some embodiments, the action or step of transmitting the back-pressure notification message to the second network node is performed only in response to a congestion notification message having been previously transmitted to the same second network node.

For example, the method may also comprise: storing a list of second network nodes to which the congestion notification message has been transmitted; storing the flow identifiers and the back-off information of all transmitted congestion notification messages; checking the stored list of second network nodes as well as the stored flow identifiers and the back-off information of all transmitted congestion notification messages to identify a second network node that is currently compensating for congestion; and in response to identifying at least one second node that is currently compensating for congestion, transmitting the back-pressure notification message to each one of the at least one second network node that has been identified to be currently compensating for congestion.

In a second aspect, this disclosure concerns a method of back-pressure control in a transport network (a.k.a. midhaul). The method is performed by a second network node. The second network node may advantageously, but not necessarily, be a network node configured for a fifth or subsequent generation telecommunications network. Sometimes, the second network node may be referred to as a reaction point throughout this disclosure. Sometimes a reaction point may alternatively be referred to as a balance point.

A back-pressure notification message is received from the first network node. The back-pressure notification message includes a combination of (1) a flow identifier identifying a flow that contributes to back-pressure and (2) back-pressure compensation information indicating a suitable compensation (e.g., reduction) for the back-pressure caused by the flow associated with said flow identifier. Furthermore, one or more parameters are adjusted or otherwise changed on the basis of said back-pressure compensation information.

In a third aspect, this disclosure concerns a computer program, comprising instructions which, when executed on at least one processor, cause the at least one processor to carry out the method according to any one of the first and second aspects described hereinabove.

Furthermore, a carrier comprising the computer program may also be provided. The carrier may, e.g., be one of an electronic signal, an optical signal, a radio signal, or a computer readable storage medium.

In a fourth aspect, a first network node for back-pressure control in a transport network is provided. The first network node is configured to perform the method according to the earlier-described first aspect.

The first network node comprises means adapted to monitor a buffer state of a buffer; means adapted to determine a condition indicative of back-pressure in response to a change of the buffer state passing a second predetermined limit; means adapted to create a back-pressure notification message in response to determining the condition indicative of back-pressure, the back-pressure notification message including a combination of (1) a flow identifier identifying a flow that contributes to back-pressure and (2) back-pressure compensation information indicating a suitable compensation (e.g., reduction) for the back-pressure; and means adapted to transmit the back-pressure notification message to a second network node.

The back-pressure compensation information may, for example, include one or more of the following parameters: back-off rate, back-off time, ramp-up time.

In some embodiments, the flow identifier may include a Packet Data Conversion Protocol (PDCP) Flow Identification (FID). Alternatively, the flow identifier may include a PDCP Group FID. Alternatively, the flow identifier may include a PDCP Multicast Group FID. Additionally, the flow identifier may also comprises an Internet Protocol (IP) address associated with the first network node.

In some embodiments, the first network node of claim may also comprise means adapted to dynamically sample the buffer such that the sampling rate is adjusted in dependence of the buffer state.

In some embodiments, the buffer state may be a buffer fill level and the change of the buffer state may be a change of the buffer fill level. The first network node may comprise means adapted to monitor the buffer fill level and means adapted to determine the condition indicative of back-pressure in response to the buffer fill level descending below the second predetermined limit.

In some embodiments, wherein the buffer state may be a buffer emptying rate at which the buffer empties and the change of the buffer state may be a change of the buffer emptying rate. The first network node may comprise means adapted to monitor the buffer emptying rate at which the buffer state empties and means adapted to determine the condition indicative of back-pressure in response to said buffer emptying rate exceeding the second predetermined limit.

In some embodiments, the first network node may additionally comprise means adapted to determine a condition indicative of congestion in response to a change of the buffer state exceeding a first predetermined limit; means adapted to create a congestion notification message in response to determining the condition indicative of congestion, the congestion notification message including a combination of: (1) a flow identifier identifying a flow that contributes to congestion; and (2) back-off information indicating a suitable back-off to compensate for the congestion caused by the flow associated with said flow identifier; and means adapted to transmit the congestion notification message to the second network node.

In some embodiments, the means adapted to transmit the back-pressure notification message to the second network node is further adapted to transmit the back-pressure notification message to the second network node only in response to that a congestion notification message having been previously transmitted to the same second network node.

In some embodiments, the first network node may further comprise means adapted to store a list of second network nodes to which the congestion notification message has been transmitted; means adapted to store the flow identifiers and the back-off information of all transmitted congestion notification messages; means adapted to check the stored list of second network nodes as well as the stored flow identifiers and the back-off information of all transmitted congestion notification messages to identify a second network node that is currently compensating for congestion; and means adapted to transmit the back-pressure notification message to each one of the at least one second network node that has been identified to be currently compensating for congestion, in response to identifying at least one second node that is currently compensating for congestion.

In a fifth aspect, a second network node for back-pressure control in a transport network is provided. The second network node is configured to perform the method according to the earlier-described second aspect.

The second network node comprises means adapted to receive a back-pressure notification message from the first network node. The back-pressure notification message includes a combination of (1) a flow identifier identifying a flow that contributes to back-pressure and (2) back-pressure compensation information indicating a suitable compensation (e.g., reduction) for the back-pressure caused by the flow associated with said flow identifier; and means adapted to adjust one or more parameters on the basis of said back-pressure compensation information.

The various embodiments described herein allow for a novel mechanism for back-pressure control which may be particularly suitable and/or useful for a 5G RAN architecture.

The various embodiments described herein suggest monitoring a buffer state of a buffer, e.g., by dynamically sampling the buffer such that the sampling rate is adjusted in dependence of the buffer state. Upon a determination by a first network node (a.k.a. detection point) of a condition indicative of back-pressure in response to a change of the buffer state passing a second predetermined limit, a back-pressure notification message can be created or otherwise generated. This back-pressure notification message can be transmitted from the first network node to one or several second network nodes (a.k.a. reaction points). Based on the received back-pressure notification message, the one or several second network nodes may compensate for a detected back-pressure by adjusting one or more of its parameters based on received information back-pressure compensation information including e.g. suggested back-off time, suggested back-off rate, and/or suggested ramp-up time. Hence, a second network node may adjust i) the time during which it performs back-off, ii) the rate at which back-off is performed, and/or iii) the ramp-up time for the back-off. Upon adjusting one or more of its parameters, it is possible for the second network node to adaptively adjust its behavior in dependence of a condition indicative of back-pressure detected by any first network node in the network, e.g. following an earlier detection of a condition indicative of congestion made by the same first network node. This way it is possible to adaptively influence the PDCP transmissions/retransmissions in the network at appropriate times. As a result, the transport network may operate more efficiently. Also, the user experience may thus be improved.

BRIEF DESCRIPTION OF DRAWINGS

These and other aspects, features and advantages will be apparent and elucidated from the following description of various embodiments, reference being made to the accompanying drawings, in which:

FIGS. 5A-5B illustrate examples in an IPv6 and a IPv4 environments, respectively.

DETAILED DESCRIPTION

Figure 1:
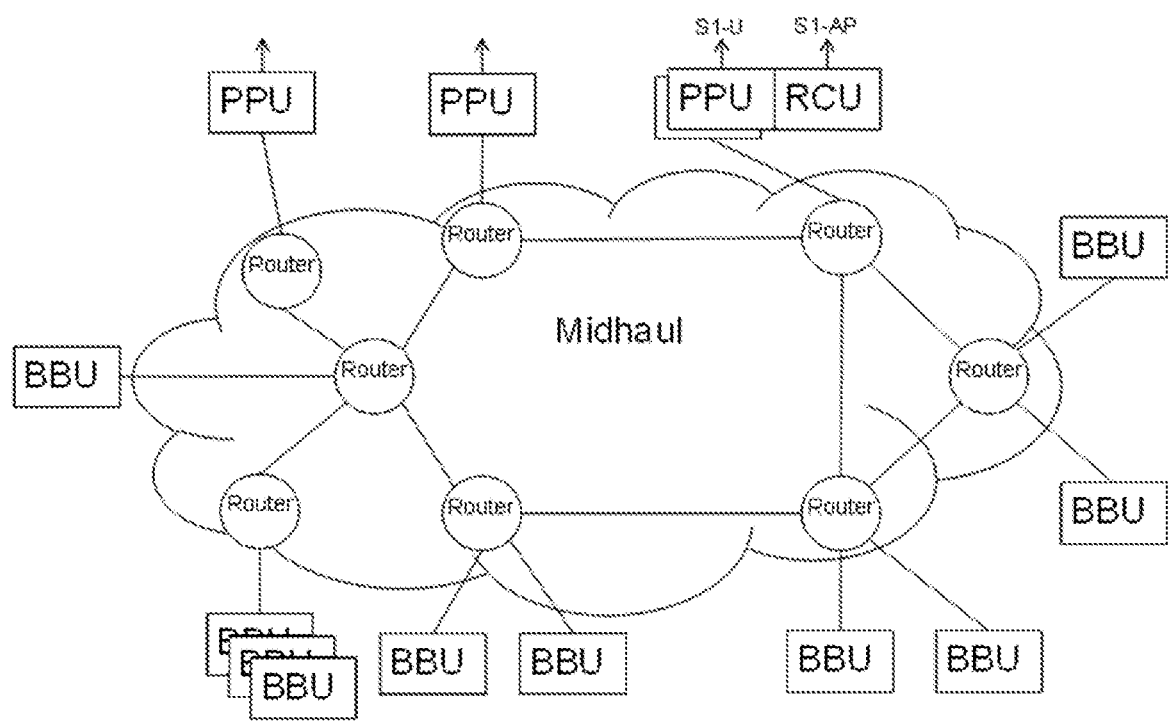
FIG. 1 illustrates an example of a midhaul architecture.

The invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements throughout the description.

As described above, some existing solutions for congestion control may be inadequate, especially in the next generations (e.g., 5G or beyond) of telecommunication networks. This disclosure recognizes that there is a need for a solution that allows for improved network efficiency.

Accordingly, it is a general object of the embodiments of the present invention to allow for improved network efficiency.

To address this, in accordance with an embodiment, described herein is a system for back-pressure control in a transport network. The system comprises a first network node (a.k.a. detection point) and at least one second network node (a.k.a. reaction point). The first network node monitors a buffer state of a buffer, e.g. a buffer which is integral with the first network node. Advantageously, the buffer is dynamically sampled such that the sampling rate is adjusted in dependence of the buffer level. Furthermore, the first network node determines or otherwise detects a condition indicative of back-pressure in response to a change of the buffer state passing a second predetermined limit. In response to determining the condition indicative of back-pressure, the first network node creates a back-pressure notification message including a combination of a flow identifier identifying a flow that contributes to back-pressure and back-pressure compensation information indicating a suitable compensation (e.g., reduction) for the back-pressure caused by the flow associated with said flow identifier. Still further, the first network node transmits the back-pressure notification message to at least one second network node. The at least one second network node receives this back-pressure notification message. Accordingly, the at least one second network node may, as a result, adjust one or more parameters on the basis of said back-pressure compensation information.

Hence, it is suggested to monitor a buffer state of a buffer, e.g., by dynamically sampling the buffer such that the sampling rate is adjusted in dependence of the buffer state. Upon a determination by the first network node of a condition indicative of back-pressure in response to a change of the buffer state passing a second predetermined limit, the back-pressure notification message can be created or otherwise generated. This back-pressure notification message can be transmitted from the first network node to one or several second network nodes. Based on the received back-pressure notification message, the one or several second network nodes may compensate for a detected back-pressure by adjusting one or more of its parameters based on received information back-pressure compensation information including e.g. suggested back-off time, suggested back-off rate, and/or suggested ramp-up time. Hence, a second network node may adjust i) the time during which it performs back-off, ii) the rate at which back-off is performed, and/or iii) the ramp-up time for the back-off. Upon adjusting one or more of its parameters, it is possible for the second network node to adaptively adjust its behavior in dependence of a condition indicative of back-pressure detected by any first network node in the network, e.g. following an earlier detection of a condition indicative of congestion made by the same first network node. This way it is possible to adaptively influence the PDCP transmissions/retransmissions in the network at appropriate times. As a result, the transport network may operate more efficiently.

With reference to FIGS. 2 A-G, a method according to an example embodiment will be described in further detail. FIG. 2A-D illustrate actions, or steps, of an example method of congestion control in a transport network. FIGS. 2E-G illustrate actions, or steps, of an example method of back-pressure control in the transport network. The method described in conjunction with FIGS. 2A-2E is performed by a first network node (a.k.a detection point). This first network node is advantageously a network node that is configured for a fifth or subsequent generation telecommunication network.

Figure 2A:
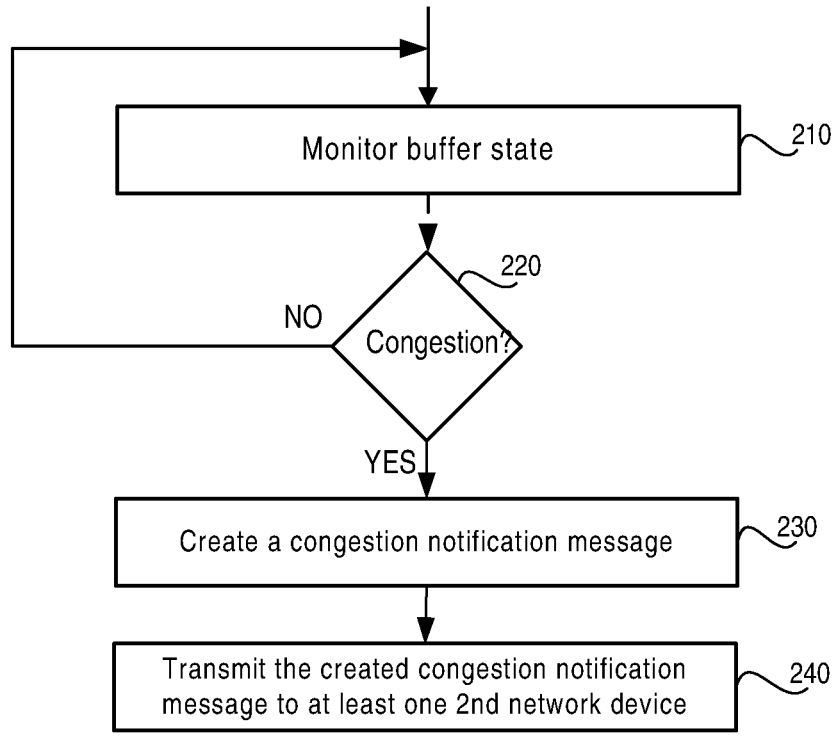
FIGS. 2A-2G are flowcharts of a method according to an embodiment.

As can be seen in FIG. 2A, a buffer state of a buffer may be monitored 210. For example, the buffer may be a buffer which is part of the first network node. In some embodiments, the buffer is thus integral with the first network node. As will be appreciated, it is not necessary that the buffer is part of the first network node. In alternative embodiments, the buffer may be external to the first network node.

In advantageous embodiments, the monitoring 210 may optionally comprise dynamically sampling the buffer such that the sampling rate is adjusted in dependence of the buffer state.

Furthermore, a condition indicative of congestion may be determined 220 in response to the buffer state exceeding a first predetermined limit. The exact level, or value, of this predetermined limit should be tested and evaluated in each specific case, e.g. in view of system requirements and/or user demands.

Figure 2B:
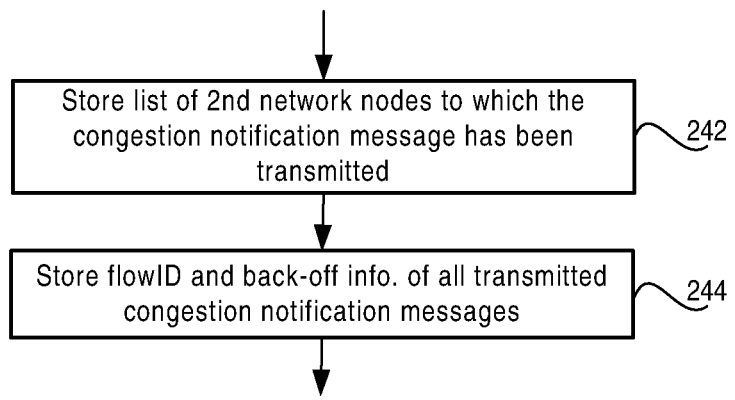
Figure 2C:
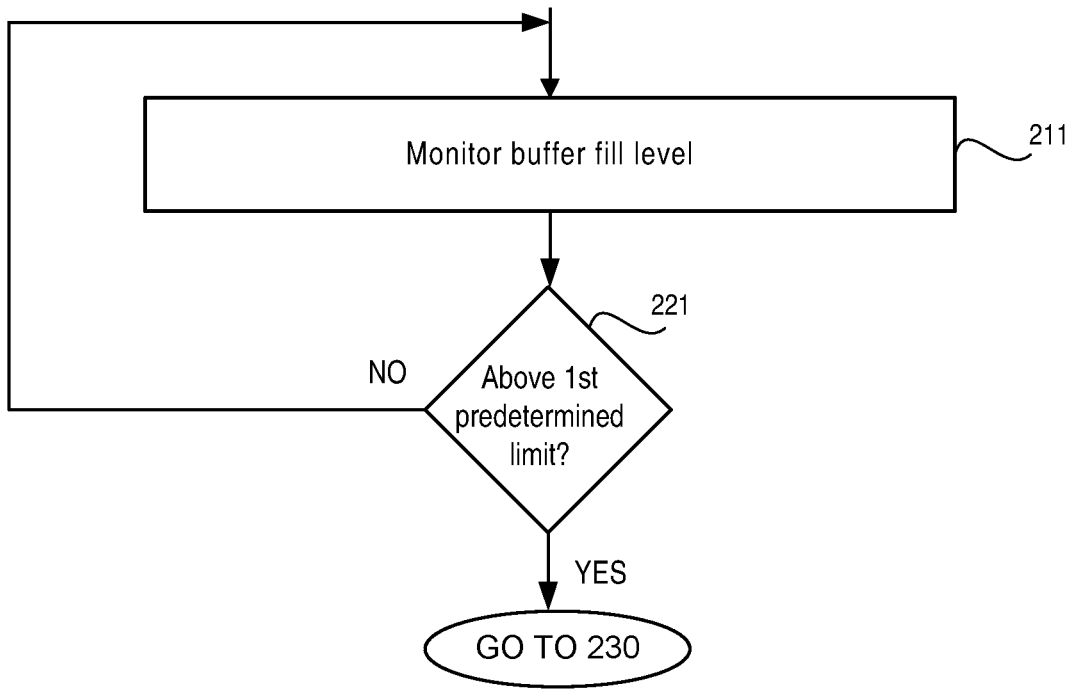

In one embodiment, which is schematically illustrated in FIG. 2C, the earlier-mentioned buffer state may be a buffer fill level. Hence, the buffer fill level may be monitored 211. Also, the condition indicative of congestion may be determined 221 in response to the buffer fill level exceeding the first predetermined first limit.

Figure 2D:
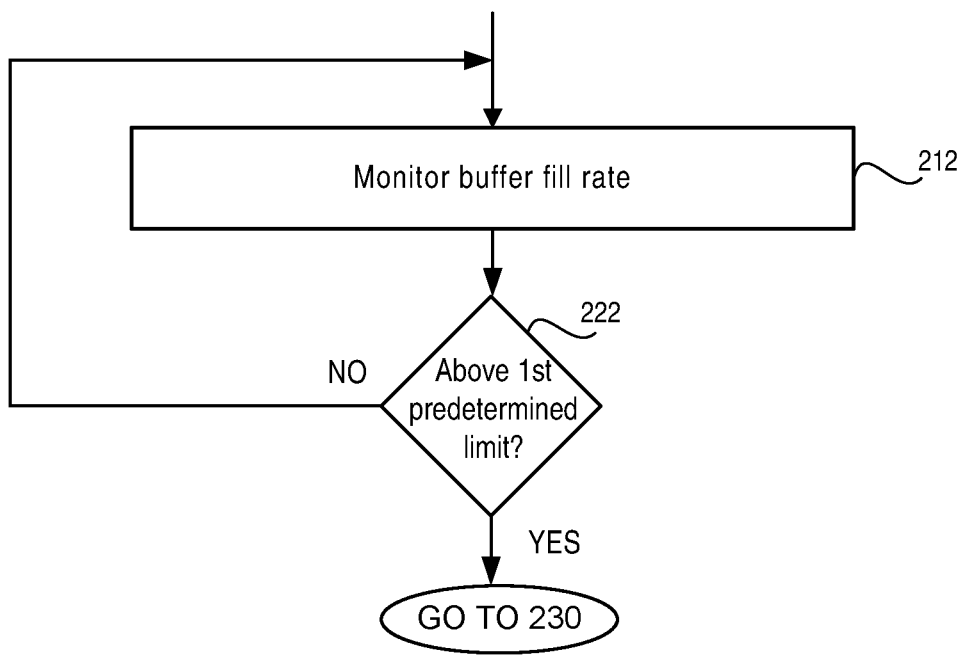

In an alternative embodiment, which is schematically illustrated in FIG. 2D, the earlier-mentioned buffer state may be a buffer change rate at which the buffer changes. Hence, the rate at which the buffer changes may be monitored 212. Also, the condition indicative of congestion may be determined 222 in response to said buffer change rate exceeding the first predetermined limit. For example, the buffer change rate is advantageously a buffer fill rate at which the buffer fills and the buffer change rate is a buffer fill rate. Accordingly, the rate at which the buffer fills may be monitored 212. Also, the condition indicative of congestion may be determined 222 in response to said buffer fill rate exceeding the first predetermined limit.

In still other embodiments, which are not illustrated in the drawings, it is conceivable to combine the above-mentioned embodiments of monitoring 211, 212 a buffer fill level and a rate at which the buffer changes, respectively.

Figure 3A:
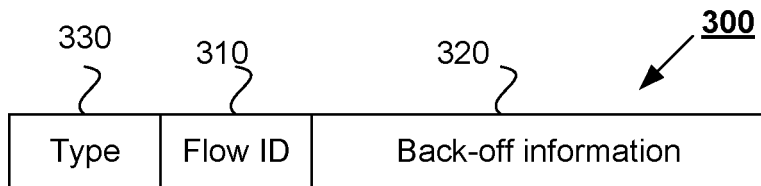
FIGS. 3A-3D illustrate example embodiments of a congestion notification message.

In response to determining the condition indicative of congestion (cf, YES in FIG. 2A), a congestion notification message 300 is created, or otherwise generated. As can be seen in FIG. 3A, this congestion notification message 300 includes at least a combination of: (1) a flow identifier 310, and (2) back-off information 320. Optionally, the congestion notification message 300 may also include a data field 330 indicating the message type, i.e. a congestion notification message.

The flow identifier 310 may identify at least one flow that contributes to the congestion. The back-off information 320 may indicate a suitable back-off to compensate for the congestion caused by the at least one flow associated with the corresponding flow identifier 310.

Figure 3B:
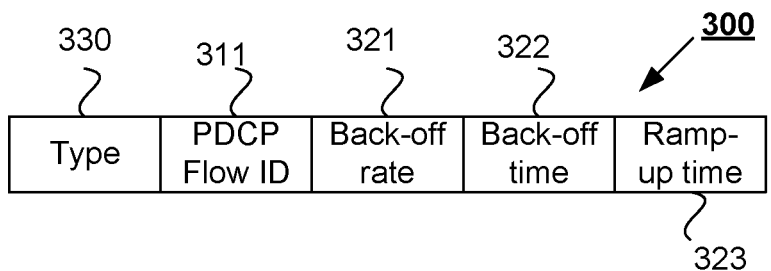

FIG. 3B schematically illustrates a first example implementation of the congestion notification message 300 shown in FIG. 3A. As can be seen in FIG. 3B, the back-off information 320 may in some embodiments include one or more of the following parameters: back-off rate 321, back-off time 322, and ramp-up time 323. Furthermore, the flow identifier 310 may include a Packet Data Conversion Protocol (PDCP) Flow Identification (FID) 311. In the example implementation shown in FIG. 3B, the Type field defines that this is a PDCP Flow ID notification message. The PDCP Flow-ID field identifies the specific flow using the following flow ID variant: PDCP Flow ID (PDCP-FID). The back-off rate 321 may comprise information about how much a second network node shall back-off. This is typically, but not necessarily, expressed in terms of rate (e.g., bandwidth) and may e.g. be an explicit rate number or described as a percentage back-off from the instantaneously used bandwidth. The back-off time 322 may comprise information about how long the back-off should be performed. This is typically, but not necessarily, expressed in terms of time (e.g., seconds). The ramp-up time 323 may comprise information about how fast the ramp-up should be, e.g., the shortest allowed time (e.g., in seconds) to get back to previous used rate (bandwidth). The back-off rate 321, back-off time 322 and ramp-up time 323 parameter values may all vary from 0 (zero), which is a special case, and up to an (in principle) unlimited value, which is also a special case.

Figure 3C:
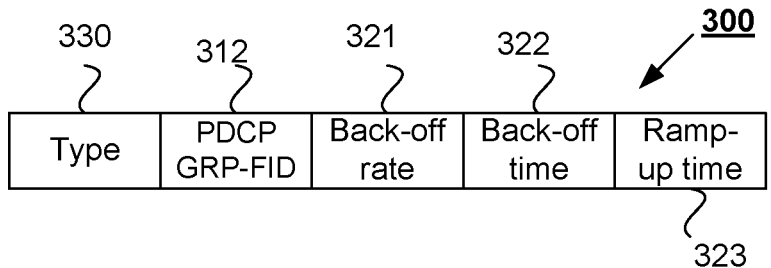

FIG. 3C schematically illustrates a second example implementation of the congestion notification message 300 shown in FIG. 3A. As can be seen in FIG. 3C, the flow identifier may include a PDCP Group Flow Identification 312.

Figure 3D:
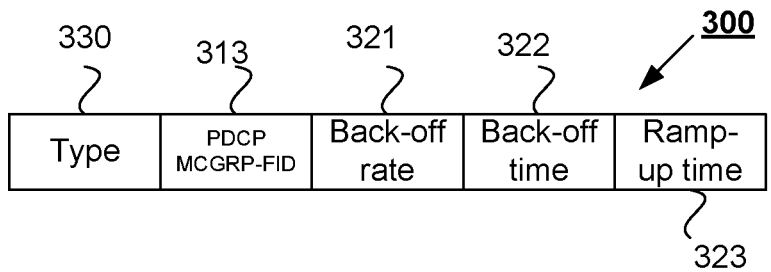

FIG. 3D schematically illustrates a third example implementation of the congestion notification message 300 shown in FIG. 3A. As can be seen in FIG. 3D, the flow identifier may include a PDCP Multicast Group Flow Identification 313.

With continued reference to FIG. 2A, the created congestion notification message 300 is also transmitted 240, i.e. sent, to a second network node. As will be appreciated, the congestion notification message 300 may be sent 240 to a single second network node, e.g. using congestion notification message 300 as illustrated in FIG. 3B. Alternatively, the congestion notification message 300 may be sent 240 to a group of several second network nodes, e.g. using congestion notification message 300 as illustrated in FIG. 3C. In still other embodiments, it is possible to send 240 a multicast message, e.g. using congestion notification message 300 as illustrated in FIG. 3D.

Reference is now made to FIG. 2B, which illustrates optional actions, or steps, in accordance with some embodiments. As can be seen in FIG. 2B, a list of second network node(s) to which the congestion notification message has been transmitted can be stored 242. For example, identifications (ID:s) of each one of said second network node(s) may be stored in this list. The ID may e.g. be an address of the respective second network node(s). Also, the flow identifiers and back-off information of all transmitted congestion notification messages may be stored 244.

Figure 2E:
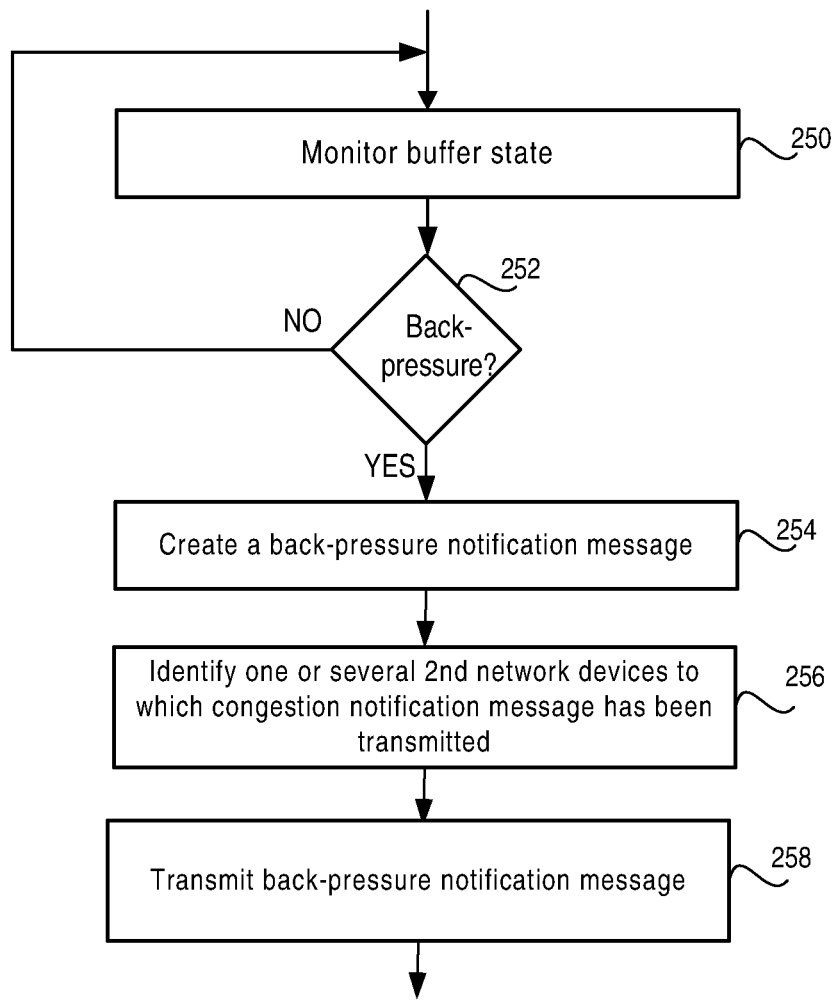

Reference is now made to FIG. 2E, which illustrates actions, or steps, of a method for back-pressure control. The buffer state of the buffer is monitored 250. For example, monitoring 250 the buffer state may include dynamically sampling the buffer such that the sampling rate is adjusted in dependence of the buffer state.

Furthermore, a condition indicative of back-pressure is detected 252 in response to a change of the buffer state passing a second predetermined limit. The exact level, or value, of this second predetermined limit should be tested an evaluated in each specific case, e.g. in view of system requirements and/or user demands.

Figure 2F:
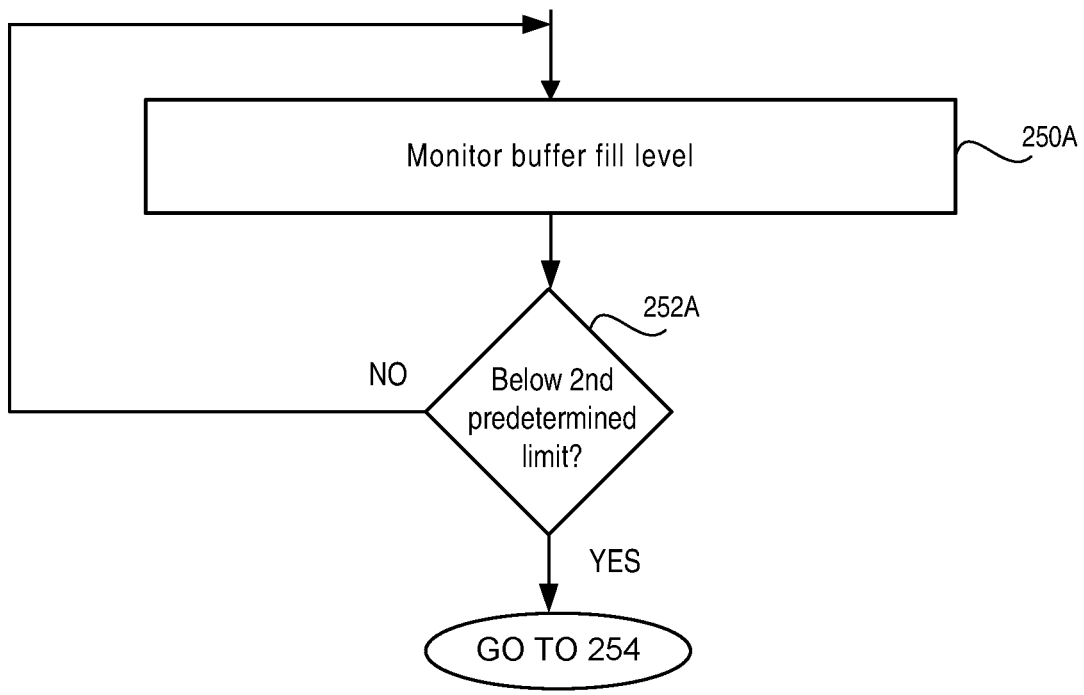

In one embodiment, which is schematically illustrated in FIG. 2F, the buffer state may be a buffer fill level and the change of the buffer state may be a change of the buffer fill level. The method may hence comprise monitoring 250A the buffer fill level and determining 252A the condition indicative of back-pressure in response to the buffer fill level descending below the second predetermined limit.

Figure 2G:
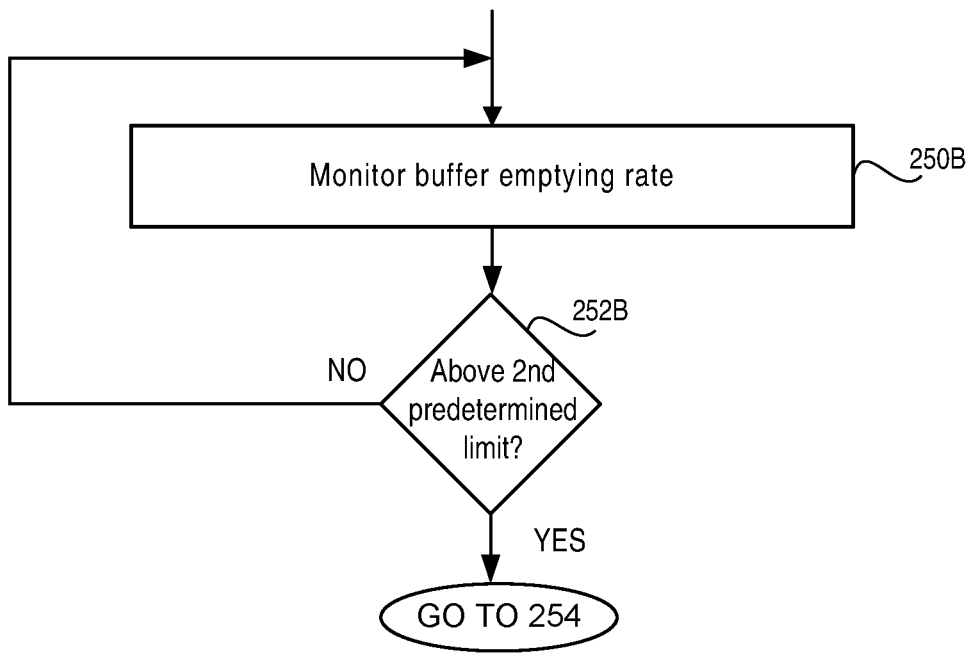

In one embodiment, which is schematically illustrated in FIG. 2G, the buffer state may be a buffer emptying rate at which the buffer empties and the change of the buffer state may be a change of the buffer emptying rate. The method may hence comprise monitoring the buffer emptying rate 250B at which the buffer state empties and determining 252B the condition indicative of back-pressure in response to said buffer emptying rate exceeding the second predetermined limit.

In still other embodiments, which are not illustrated in the drawings, it is conceivable to combine the above-mentioned embodiments described in conjunction with FIGS. 2F and 2G, respectively.

In response to determining the condition indicative of back-pressure (cf, YES in FIG. 2E), a back-pressure notification message 400 is created 254 or otherwise generated.

Figure 4A:
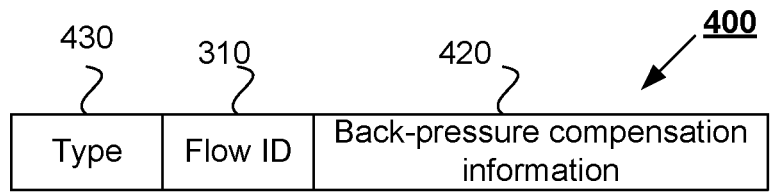
FIGS. 4A-4D illustrate example embodiments of a back-pressure notification message.

As can be seen in FIG. 4A, the back-pressure notification message 400 may include a flow identifier 310. Also, the back-pressure notification message 400 may include back-pressure compensation information 420. Optionally, the back-pressure notification message 400 may also include a data field 430 indicating the message type, i.e. a back-pressure notification message 400.

The flow identifier 310 may identify at least one flow that contributes to identifying a flow that contributes to back-pressure. The back-pressure compensation information 420 may indicate a suitable compensation for the back-pressure caused by the at least one flow associated with said flow identifier 310.

Figure 4B:
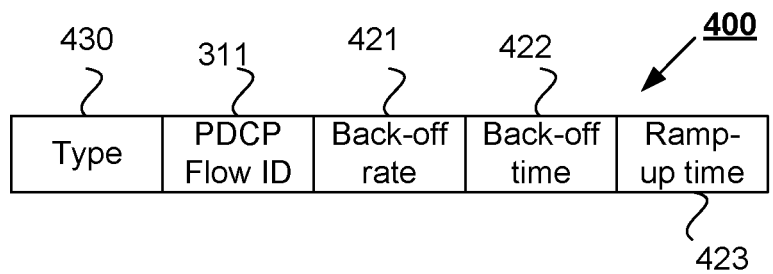

FIG. 4B schematically illustrates a first example implementation of the back-pressure notification message 400 shown in FIG. 4A. As can be seen in FIG. 4B, the back-pressure compensation information 420 may in some embodiments include one or more of the following parameters: back-off rate 421, back-off time 422, and ramp-up time 423. Furthermore, the flow identifier 310 may include a Packet Data Conversion Protocol (PDCP) Flow Identification (FID) 311. In the example implementation shown in FIG. 4B, the Type field defines that this is a PDCP Flow ID notification message. The P PDCP Flow-ID field identifies the specific flow using the following flow ID variant: PDCP Flow ID (PDCP-FID). The back-off rate 421 may comprise information about how much a second network node shall back-off. This is typically, but not necessarily, expressed in terms of rate (e.g., bandwidth) and may e.g. be an explicit rate number or described as a percentage back-off from the instantaneously used bandwidth. The back-off time 422 may comprise information about how long time the back-off should be performed. This is typically, but not necessarily, expressed in terms of time (e.g., seconds). The ramp-up time 423 may comprises information about how fast the ramp-up should be, e.g., the shortest allowed time (e.g., in seconds) to get back to previous used rate (bandwidth).

Figure 4C:
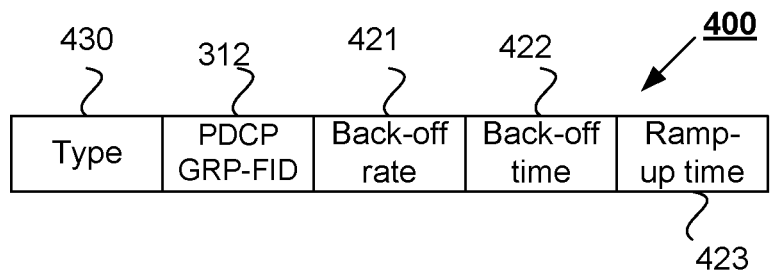

FIG. 4C schematically illustrates a second example implementation of the back-pressure notification message 400 shown in FIG. 4A. As can be seen in FIG. 4C, the flow identifier may include a PDCP Group Flow Identification 312.

Figure 4D:
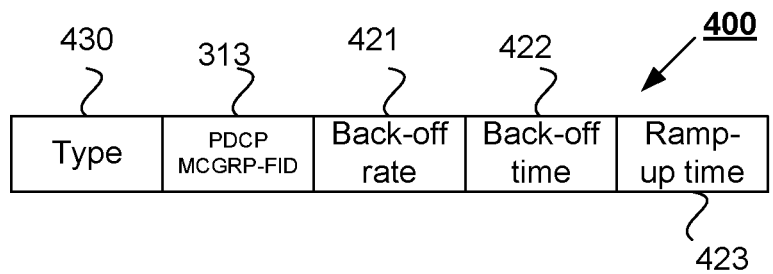

FIG. 4D schematically illustrates a third example implementation of the back-pressure notification message 400 shown in FIG. 4A. As can be seen in FIG. 4D, the flow identifier may include a PDCP Multicast Group Flow Identification 313.

In some embodiments, the flow identifier 310 may additionally comprise an IP address associated with the first network node.

As will be appreciated, the back-pressure notification message 400 may be similar to the congestion notification message 300 shown in FIGS. 3A-3D. Typically, the difference is in the values of the different data fields 421, 422, and 423 (compared with the corresponding values of the corresponding data fields 321, 322, 323). While the values of the data fields 321, 322, 323 are used to indicate a suitable back-off to compensate for a detected condition indicative of congestion, the values of the data fields 421, 422, and 423 are used to indicate a suitable compensation for a detected condition indicative of back-pressure in the transport network.

With continued reference to FIG. 2E, the created back-pressure notification message 400 is also sent 258, i.e. transmitted, to at least one second network node. As will be appreciated, the back-pressure notification message 400 may be sent 240 to a single second network node, e.g. using congestion notification message 400 as illustrated in FIG. 4B. Alternatively, the back-pressure notification message 400 may be sent 240 to a group of several second network nodes, e.g. using congestion notification message 400 as illustrated in FIG. 4C. In still other embodiments, it is possible to send 240 a multicast message, e.g. using back-pressure notification message 400 as illustrated in FIG. 4D.

In some embodiments, the method may optionally include transmitting 258 the back-pressure notification message to at least one second network node if and only if a congestion notification message 300 has been previously transmitted to the same at least one second network node.

To this end, the method may comprise checking 256 the stored list of second network nodes as well as the stored flow identifiers and the back-off information of all transmitted congestion notification messages to identify a second network node(s) that is/are currently compensating for congestion. Once identified, the back-pressure notification message 400 may be transmitted to each one of the second network node(s) that has/have been identified to be currently compensating for congestion.

With reference to FIGS. 5A and 5B, it should be understood that the PDCP FID:s described hereinabove (e.g., PDCP-FID, PDCP-GRP-FID, PDCP-MCGRP-FID) may in some embodiments be carried by different protocols and in different ways. FIG. 5A shows an example in Internet Protocol version 6, IPv6. FIG. 5B shows an example in Internet Protocol version 4, IPv4.

Figure 6:
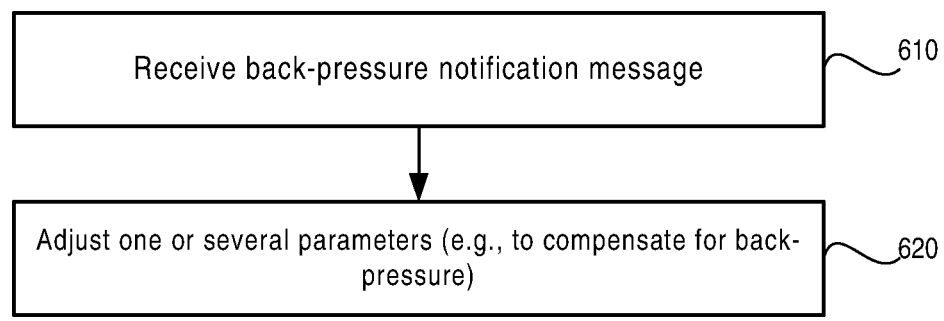
FIG. 6 is a flowchart of a method according to an embodiment.

Reference is now made to FIG. 6, which schematically illustrates a flowchart of a corresponding method performed by a second network node. This second network node is advantageously a network node that is configured for a fifth or subsequent generation telecommunication network.

As can be seen in FIG. 6, a back-pressure notification message 400 is received 610 from a first network node. As can be seen in FIGS. 4A-4D, the back-pressure notification message 400 includes a combination of a flow identifier 310 identifying a flow that contributes to back-pressure and back-pressure compensation information 420 indicating a suitable compensation for the back-pressure caused by the flow associated with said flow identifier 310: Furthermore, one or more parameters are adjusted 520, or otherwise changed, on the basis of said back-pressure compensation information 420.

The various embodiments described herein may be applied in different ways. For example, the flow control may be provided at IP level, managing IP flow control for PDCP over the midhaul of a 5G RAN. The flow control described in this disclosure may be seen as comprising three main parts, or functions:

1. Detection point (i.e. the first network node): the point where a reduced congestion state is detected and notification messages (i.e., back-pressure notification messages) are sent from. It should be appreciated that any intermediate IP router may also be a detection point.
2. Reaction point (i.e. the second network node(s)): the points where the action is taken on the reduced congestion based on received notification message. It should be appreciated that any intermediate IP router may also be a detection point.
3. Back-pressure notification messages: The message sent between detection point and the reaction point, informing the reaction points of back-pressure and including back-pressure compensation information to assist reaction points in compensating for a detected back-pressure.

In some embodiments and for traffic in the PDCP domain, the PDCP flow(s) may be marked with PDCP Flow ID (PDCP-FID, single PDCP flow) and/or (PDCP-GRP-FID, for PDCP group flows), which may for instance be encoded into the IP flow ID header (IPv6), or in a separate IP option, or any kind of protocol header.

For example, the detection point may identify a congestion state or a change rate of the congestion state by monitoring the buffer. When a buffer decreases to certain buffer level or the buffer emptying rate reaches a certain emptying rate level the notification message may be sent to the reaction point(s) being under back-off. In some embodiments and in order to send the notification message the detection point will, the detection point may use the source IP-address and PDCP-FID and/or PDCP-GRP-FID of the identified flow(s) being under back-off. In case of sending the message to multiple reaction points at the same time, multicast may be used as an alternative. In the latter case, a special Multicast PDCP group notification FID (PDCP-MCGRP-FID) may be used. This can be used in both down and uplink direction. As described earlier, the notification message 400 may include information of changed time to back-off and/or level of back off and/or ramp-up time.

In some embodiments, it is possible to use or otherwise utilize "watermarks". The working principle of a detection point may then be as follows. The buffer-level and change-rate of buffer level in each Quality-of-Service (QoS) queue is checked together with the related Source IP-address including PDCP-FID and/or PDCP-GRP-FID.

According to some aspects of the international patent application PCT/SE2016/050144 the sampling of the buffer is dynamic, meaning that when there is high buffer occupation the sampling rate is increased and when the buffer occupation is low the sampling rate is lower. When the watermark is passed, the detection point may send a congestion notification message to the reaction point identified by IP-address and related PDCP-FID and/or PDCP-GRP-FID. When multicast is used the detection point may send to the multicast source specific IP group and may use the related PDCP-MCGRP-FID. As described earlier, the congestion notification message 300 may for example comprise information on i) how much (expressed as rate) the reaction point(s) should back off, ii) for how long time (expressed in time) the reaction point(s) should back off and iii) the ramp-up time after a back-off. For further details with respect to the congestion notification messages, see FIGS. 3A-3D.

A dynamical sampling makes it possible to adaptively adjust, or otherwise change, the sampling rate. For example, when the traffic intensity is low and thus a buffer fill level is low, the sampling rate may also be adjusted to be low as there is typically no (or, little) need for detailed flow information. Furthermore, when the traffic intensity is low it may be advantageous to reduce the sampling rate as this will also limit the usage of processing resources and power. However, when the traffic intensity increases the sampling rate may also be adjusted to increase, e.g., to make it easier to identify the flow(s) that is/are consuming most bandwidth.

In this disclosure, embodiments are provided to improve the network usage efficiency even further. For example, an idea is to address the network usage efficiency in a detection point that e.g. monitors when the buffer level goes below certain level or when the buffer emptying rate increases to a certain rate. The detection point may have a database storing a list of all reaction points that are under back-off and their respective timer status. Upon detection of a condition indicative of back-pressure, new notification messages (i.e., the back-pressure notification messages) may be sent to the reaction point(s) being under back-off (i.e., the reaction point(s) to which the detection point has sent congestion notification messages and that has/have time left on their respective back-off timer). The back-pressure notification messages may include information related to back-off rate and/or back-off time and/or ramp-up time such that the reaction point(s) may end the back-off and start sending messages (and thus add traffic) again. The detection point may send the back-pressure notification messages to the reaction point(s) by addressing them with their respective IP-address and related PDCP-FID and/or PDCP-GRP-FID. When multicast is used the detection point may send to a multicast source specific IP group and may use the related PDCP-MCGRP-FID.

Figure 7:
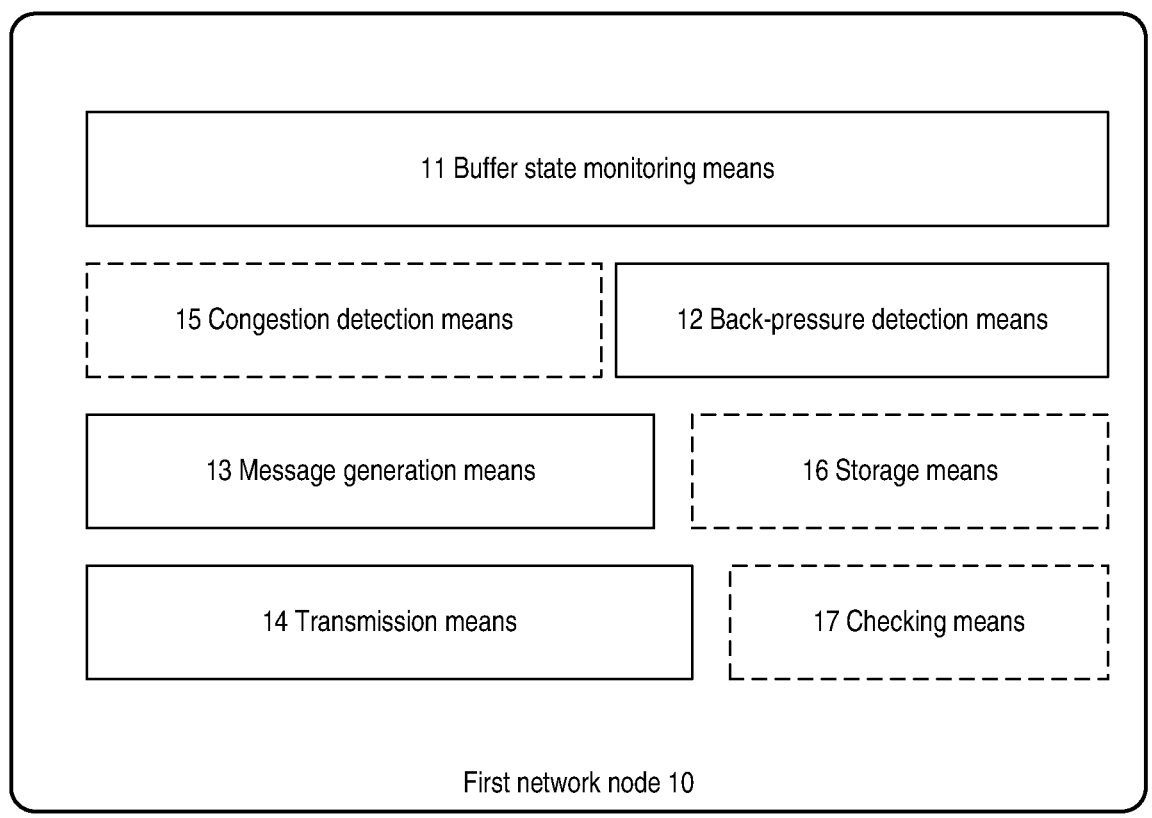
FIG. 7 illustrates an example embodiment of a first network node.

Reference is now made to FIG. 7, which illustrates an example embodiment of a first network node 10. The first network node is configured to perform, or otherwise carry out, any of the methods described with reference to FIGS. 2A-2E. The first network node 10 is advantageously a network node configured for a 5G or subsequent generation telecommunications network.

The first network node 10 comprises means 11 adapted to monitor a buffer state of a buffer. Furthermore, means 12 adapted to determine a condition indicative of back-pressure are provided. The means 12 are adapted to determine the condition indicative of back-pressure in response to a change of the buffer state passing a second predetermined limit. Still further, the first network node 10 comprises means 13 adapted to create a back-pressure notification message 400 in response to determining the condition indicative of back-pressure. The back-pressure notification message 400 includes a combination of a flow identifier 310 and back-pressure compensation information 420. The flow identifier 310 may identify or otherwise indicate at least one flow that contributes to back-pressure. The back-pressure compensation information 420 may indicate a suitable compensation for the back-pressure.

The above-mentioned back-pressure compensation information 420 typically, but not necessarily, includes one or more of the following parameters: back-off rate 421, back-off time 422, ramp-up time 423.

In some embodiments, the flow identifier 310 may include a PDCP FID. Alternatively, the flow identifier 310 may include a PDCP Group FID. Alternatively, the flow identifier 310 may include a PDCP Multicast Group FID. Additionally, the flow identifier 310 may also comprise an IP address associated with the first network node.

Moreover, the first network node 10 comprises means 14 adapted to transmit the back-pressure notification message to at least one second network node.

In some embodiments, means 11 are adapted to dynamically sample the buffer such that the sampling rate is adjusted in dependence of the buffer state.

In some embodiments, the buffer state may be a buffer fill level and the change of the buffer state may be a change of the buffer fill level. Hence, the first network node 10 may comprise means 11 adapted to monitor the buffer fill level and means 12 adapted to determine the condition indicative of back-pressure in response to the buffer fill level descending below the second predetermined limit.

In some embodiments, the buffer state may be a buffer emptying rate at which the buffer empties and the change of the buffer state may be a change of the buffer emptying rate. Hence, the first network node 10 may comprise means 11 adapted to monitor the buffer emptying rate at which the buffer state empties and means 12 adapted to determine the condition indicative of back-pressure in response to said buffer emptying rate exceeding the second predetermined limit.

In advantageous embodiments, the first network node 10 may optionally also comprise means 15 adapted to determine a condition indicative of congestion in response to a change of the buffer state exceeding a first predetermined limit. The means 13 may also be adapted to create a congestion notification message in response to determining the condition indicative of congestion. The congestion notification message may, e.g., include a combination of (1) a flow identifier identifying a flow that contributes to congestion and (2) back-off information indicating a suitable back-off to compensate for the congestion caused by the flow associated with said flow identifier. Furthermore, the means 14 may be adapted to transmit the congestion notification message to the at least one second network node.

In some embodiments, the means 14 adapted to transmit the back-pressure notification message to the network node is further adapted to transmit the back-pressure notification message to the second network node only in response to that the congestion notification message having been previously transmitted to the same second network node.

With continued reference to FIG. 7, the first network node 10 may also comprise means 16 adapted to store a list of second network nodes to which the congestion notification message has been transmitted and means 16 adapted to store the flow identifiers and the back-off information of all transmitted congestion notification messages. The first network node 10 may optionally also comprise means 17 adapted to check the stored list of second network nodes as well as the stored flow identifiers and the back-off information of all transmitted congestion notification messages to identify a second network node that is currently compensating for congestion. For example, the means 14 may be adapted to transmit the back-pressure notification message 400 to each one of the at least one second network node that have been identified to be currently compensating for congestion, in response to identifying at least one second node that is currently compensating for congestion.

Figure 8:
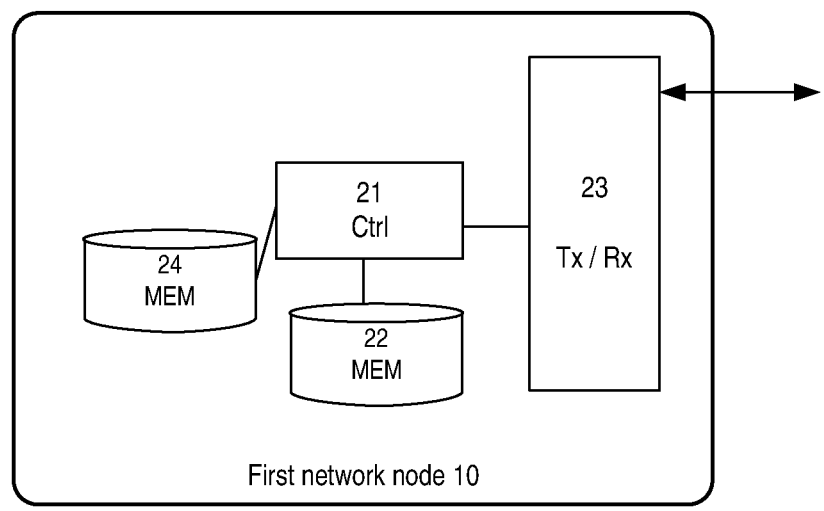
FIG. 8 illustrates an example implementation of the first network node in FIG. 7.

FIG. 8 illustrates an example implementation of the first network node 10 illustrated in FIG. 7. In this example implementation, the first network node 10 comprises a processor 21 and a memory 22. Also, a communications interface 23 may be provided in order to allow the first network node to communicate with other apparatuses (e.g., one or several second network nodes), etc. To this end, the communications interface 23 may comprise a transmitter (Tx) and a receiver (Rx). Alternatively, the communications interface 23 may comprise a transceiver (Tx/Rx) combining both transmission and reception capabilities. The communications interface 23 may include a RF interface allowing the first network node to communicate with apparatuses etc through a radio frequency band through the use of different radio frequency technologies e.g. standardized by the 3rd Generation Partnership Project (3GPP), or any other wireless technology such as Wi-Fi, Bluetooth®, etcetera.

The memory 22 comprises instructions executable by the processor 21 whereby the first network node 10 is operative to:

monitor a buffer state of a buffer;

determine a condition indicative of back-pressure in response to a change of the buffer state passing a second predetermined limit;

create a back-pressure notification message in response to determining the condition indicative of back-pressure, the back-pressure notification message including a combination of (1) a flow identifier identifying a flow that contributes to back-pressure and (2) back-pressure compensation information indicating a suitable compensation for the back-pressure caused by the flow associated with said flow identifier; and transmit, by means of the transmitter 23, the back-pressure notification message to a second network node.

In some embodiments, the memory 22 may further comprise instructions executable by the processor 21 whereby the first network node 10 is operative to dynamically sampling the buffer such that the sampling rate is adjusted in dependence of the buffer state.

In some embodiments, the buffer state may be a buffer fill level and the change of the buffer state may be a change of the buffer fill level. The memory 22 may further comprise instructions executable by the processor 21 whereby the first network node 10 is operative to monitor the buffer fill level and determine the condition indicative of back-pressure in response to the buffer fill level descending below the second predetermined limit.

In some embodiments, the buffer state may be a buffer emptying rate at which the buffer empties and the change of the buffer state may be a change of the buffer emptying rate. The memory 22 may further comprise instructions executable by the processor 21 whereby the first network node 10 is operative to monitor the buffer emptying rate at which the buffer state empties and determine the condition indicative of back-pressure in response to said buffer emptying rate exceeding the second predetermined limit.

The memory 22 may further comprise instructions executable by the processor 21 whereby the first network node 10 is operative to, prior to determining the condition indicative of back-pressure:

determine a condition indicative of congestion in response to a change of the buffer state exceeding a first predetermined limit;

create a congestion notification message in response to determining the condition indicative of congestion, the condition indicative of congestion including a combination of (1) a flow identifier identifying a flow that contributes to congestion and (2) back-off information indicating a suitable back-off to compensate for the congestion caused by the flow associated with said flow identifier; and transmit, by means of the transmitter 23, the congestion notification message to the second network node.

The memory 22 may further comprise instructions executable by the processor 21 whereby the first network node 10 is operative to transmit (by means of the transmitter 23) the back-pressure notification message to the second network node only in response to that the congestion notification message has been previously transmitted to the same second network node.

A memory 24 may be used or otherwise utilized to tore a list of second network nodes to which the congestion notification message has been transmitted. The memory 24 may also store the flow identifiers and the back-off information of all transmitted congestion notification messages; The memory 22 may further comprise instructions executable by the processor 21 whereby the first network node 10 is operative to checking the stored list of second network nodes as well as the stored flow identifiers and the back-off information of all transmitted congestion notification messages to identify a second network node that is currently compensating for congestion. Furthermore, the memory 22 may further comprise instructions executable by the processor 21 whereby the first network node 10 is operative to transmit the back-pressure notification message, by means of the transmitter 23, to each one of the at least one second network node that has been identified to be currently compensating for congestion. This may be performed in response that at least one second node that is currently compensating for congestion have been identified.

Figure 9:
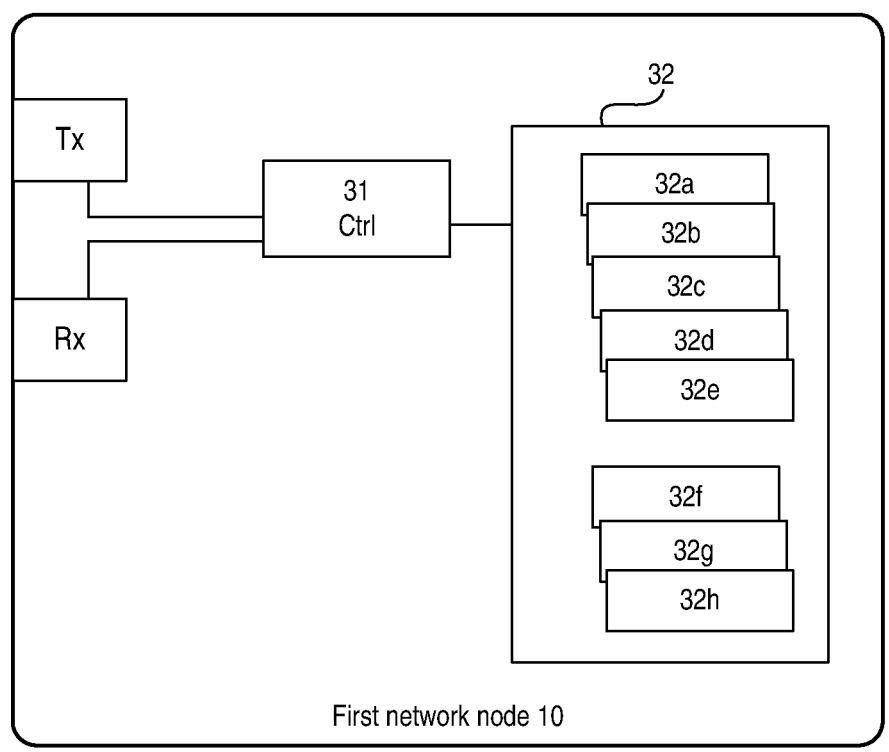
FIG. 9 illustrates an example implementation of the first network node in FIG. 7.

Reference is now made to FIG. 9, which illustrates another example implementation of the first network node 10. In this example implementation, the first network node 10 comprises a processor 31, and one or several modules 32*a-h*. Also, a communications interface may be provided in order to allow the first network node 10 to communicate with other apparatuses (e.g., one or several second network nodes), etc. To this end, the communications interface may comprise a transmitter (Tx) and/or a receiver (Rx). Alternatively, the communications interface may comprise a transceiver (Tx/Rx) combining both transmission and reception capabilities. The communications interface may include a RF interface allowing the first network node 10 to communicate with apparatuses etc through a radio frequency band through the use of different radio frequency technologies e.g. standardized by the 3rd Generation Partnership Project (3GPP), or any other wireless technology such as Wi-Fi, Bluetooth®, etcetera.

A buffer state monitoring module 32*a* is configured to monitoring a buffer state of a buffer. Furthermore, a back-pressure detection module 32*b* is provided for determining a condition indicative of back-pressure in response to a change of the buffer state passing a second predetermined limit. Still further, a back-pressure notification message generation module 32*c* is configured to create a back-pressure notification message in response to determining the condition indicative of back-pressure. The back-pressure notification message includes a combination of a flow identifier identifying a flow that contributes to back-pressure and back-pressure compensation information indicating a suitable compensation for the back-pressure caused by the flow associated with said flow identifier. Furthermore, the transmitter (Tx) is configured to transmit the back-pressure notification message to a second network node.

In some embodiments, the buffer state monitoring module 32*a* may be configured to dynamically sample the buffer such that the sampling rate is adjusted in dependence of the buffer state.

In some embodiments, the buffer state may be a buffer fill level and the change of the buffer state may be a change of the buffer fill level. The buffer state monitoring module 32*a* may be configured to monitor the buffer fill level and the back-pressure detection module 32*b* may be configured to determine the condition indicative of back-pressure in response to the buffer fill level descending below the second predetermined limit.

In some embodiments, the buffer state may be a buffer emptying rate at which the buffer empties and the change of the buffer state may be a change of the buffer emptying rate. The buffer state monitoring module 32*a* may be configured to monitor the buffer emptying rate at which the buffer state empties; and the back-pressure detection module 32*b* may be configured to determine the condition indicative of back-pressure in response to said buffer emptying rate exceeding the second predetermined limit.

The first network node 10 may additionally comprise a congestion detection module 32*d* configured to determine a condition indicative of congestion in response to a change of the buffer state exceeding a first predetermined limit. Still further, a congestion notification message generation module 32*e* is configured to create a congestion notification message in response to determining the condition indicative of congestion. The congestion notification message may include a combination of a flow identifier identifying a flow that contributes to congestion and back-off information indicating a suitable back-off to compensate for the congestion caused by the flow associated with said flow identifier.

The transmitter (Tx) may further be configured to transmit the congestion notification message to the second network node.

In some embodiments, the transmitter (Tx) is configured to transmit the back-pressure notification message to the second network node only in response to that a congestion notification message has been previously transmitted to the same second network node.

Optionally, a first storage module 32f for storing a list of second network nodes to which the congestion notification message has been transmitted may also provided. Also, a second storage module 32g for storing the flow identifiers and the back-off information of all transmitted congestion notification messages may be provided. A checking module 32h may also be provided for checking the stored list of second network nodes as well as the stored flow identifiers and the back-off information of all transmitted congestion notification messages to identify a second network node that is currently compensating for congestion. The transmitter (Tx) may, e.g., be configured to transmit the back-pressure notification message to each one of the at least one second network node that has been identified to be currently compensating for congestion.

Figure 10:
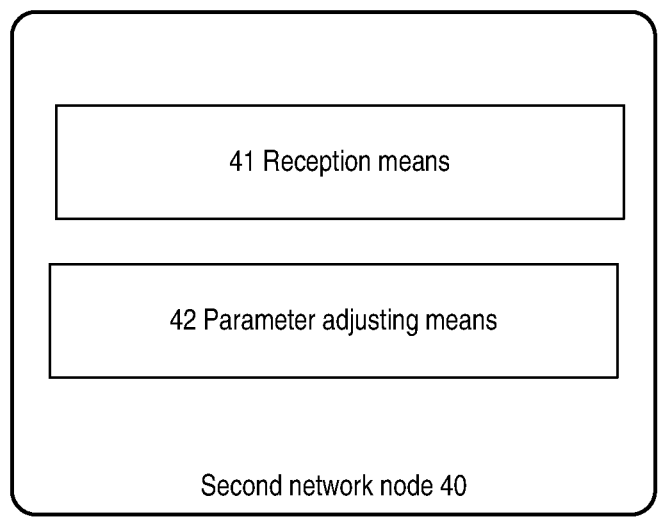
FIG. 10 illustrates an example embodiment of a second network node.

Reference is now made to FIG. 10, which illustrates an example embodiment of a second network node 40. The second network node 40 is configured to perform, or otherwise carry out, any of the method described with reference to FIG. 6. The second network node 40 is advantageously a network node configured for a 5G or a subsequent generation telecommunications network.

The second network node 40 is suitable for flow control in a transport network. As can be seen in FIG. 10, the second network node 40 comprises means 31 adapted to receive, from a first network node, a back-pressure notification message 400. As described earlier, the back-pressure notification message 400 includes a combination of: (1) a flow identifier 310 identifying a flow that contributes to back-pressure and (2) back-pressure compensation information 420 indicating a suitable compensation for the back-pressure caused by the flow associated with said flow identifier 310. Furthermore, the second network node 30 comprises means 32 adapted to adjust one or more parameters on the basis of said back-pressure compensation information.

Figure 11:
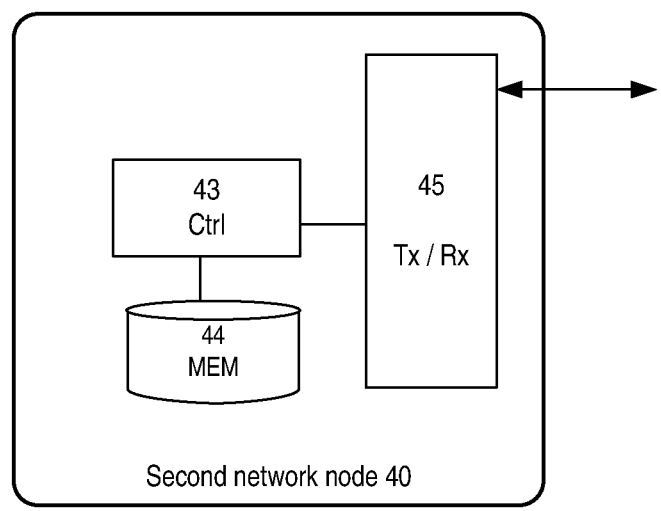
FIG. 11 illustrates an example implementation of the second network node in FIG. 10.

FIG. 11 illustrates an example implementation of the second network node 40 illustrated in FIG. 10. In this example implementation, the second network node 40 comprises a processor 43 and a memory 44. Also, a communications interface 45 may be provided in order to allow the first network node to communicate with other apparatuses (e.g., a first network node), etc. To this end, the communications interface 45 may comprise a transmitter (Tx) and a receiver (Rx). Alternatively, the communications interface 45 may comprise a transceiver (Tx/Rx) combining both transmission and reception capabilities. The communications interface 45 may include a RF interface allowing the first network node to communicate with apparatuses etc through a radio frequency band through the use of different radio frequency technologies e.g. standardized by the 3rd Generation Partnership Project (3GPP), or any other wireless technology such as Wi-Fi, Bluetooth®, etcetera.

The memory 44 comprises instructions executable by the processor 43 whereby the second network node 40 is operative to receive (from a first network node) a back-pressure notification message by means of the receiver 45. As described earlier, the back-pressure notification message 400 includes a combination of: (1) a flow identifier 310 identifying a flow that contributes to back-pressure and (2) back-pressure compensation information 420 indicating a suitable compensation for the back-pressure caused by the flow associated with said flow identifier 310. Furthermore, the memory 44 comprises instructions executable by the processor 43 whereby the second network node 40 is operative to adjust one or more parameters on the basis of said back-pressure compensation information.

Figure 12:
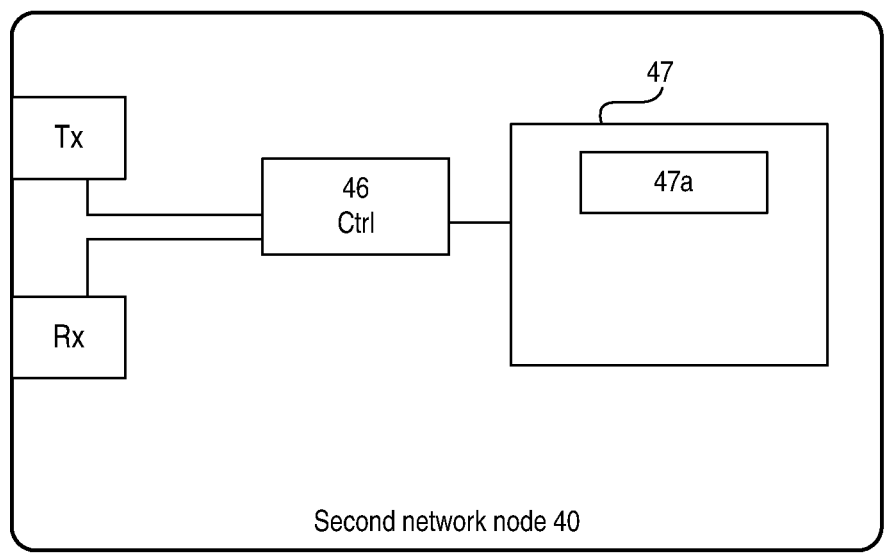
FIG. 12 illustrates an example implementation of the second network node in FIG. 10.

Reference is now made to FIG. 12, which illustrates another example implementation of the second network node 40. In this example implementation, the second network node 40 comprises a processor 46, and one or several modules 47a. Also, a communications interface may be provided in order to allow the second network node 40 to communicate with other apparatuses (e.g., a first network node), etc. To this end, the communications interface may comprise a transmitter (Tx) and/or a receiver (Rx). Alternatively, the communications interface may comprise a transceiver (Tx/Rx) combining both transmission and reception capabilities. The communications interface may include a RF interface allowing the second network node 40 to communicate with apparatuses etc through a radio frequency band through the use of different radio frequency technologies e.g. standardized by the 3rd Generation Partnership Project (3GPP), or any other wireless technology such as Wi-Fi, Bluetooth®, etcetera.

The receiver (Rx) is configured to receive the back-pressure notification message, wherein the back-pressure notification message 400 includes said combination of (1) a flow identifier 310 identifying a flow that contributes to back-pressure and (2) back-pressure compensation information 420 indicating a suitable compensation for the back-pressure caused by the flow associated with said flow identifier 310. Also, a parameter adjustment module 47a is configured to adjust or otherwise change one or more parameters on the basis of said back-off information.

Figure 13:
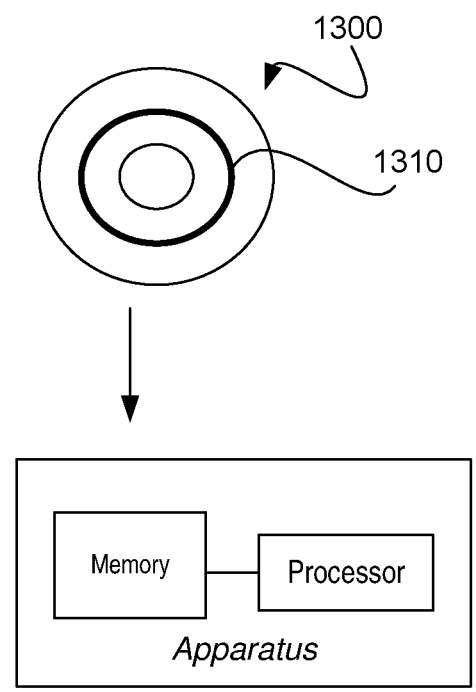
FIG. 13 illustrates a carrier comprising a computer program, in accordance with an embodiment.

FIG. 13 shows an example of a computer-readable medium, in this example in the form of a data disc 1300. In one embodiment the data disc 1300 is a magnetic data storage disc. The data disc 1300 is configured to carry instructions 1310 that can be loaded into a memory of an apparatus. Upon execution of said instructions by a processor of the apparatus, the apparatus is caused to execute a method or procedure according to any one of the methods described in this disclosure. The data disc 1300 is arranged to be connected to or within and read by a reading device (not shown), for loading the instructions into the processor. One such example of a reading device in combination with one (or several) data disc(s) 1300 is a hard drive. It should be noted that the computer-readable medium can also be other mediums such as compact discs, digital video discs, flash memories or other memory technologies commonly used. In such an embodiment the data disc 1300 is one type of a tangible computer-readable medium. The instructions may alternatively be downloaded to a computer data reading device, such as a computer or other apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

The various embodiments described herein suggest monitoring a buffer state of a buffer, e.g., by dynamically sampling the buffer such that the sampling rate is adjusted in dependence of the buffer state. Upon a determination by a first network node (a.k.a. detection point) of a condition indicative of back-pressure in response to a change of the buffer state passing a predetermined limit, a back-pressure notification message can be created or otherwise generated. This back-pressure notification message can be transmitted from the first network node to one or several second network nodes (a.k.a. reaction points). Based on the received back-pressure notification message, the one or several second network nodes may compensate for a detected back-pressure by adjusting one or more of its parameters based on received information back-pressure compensation information including e.g. suggested back-off time, suggested back-off rate, and/or suggested ramp-up time. Hence, a second network node may adjust i) the time during which it performs back-off, ii) the rate at which back-off is performed, and/or iii) the ramp-up time for the back-off. Upon adjusting one or more of its parameters, it is possible for the second network node to adaptively adjust its behavior in dependence of a condition indicative of back-pressure detected by any first network node in the network, e.g. following an earlier detection of a condition indicative of congestion made by the same first network node. This way it is possible to adaptively influence the PDCP transmissions/retransmissions in the network at appropriate times. As a result, the transport network may operate more efficiently. Also, the user experience may thus be improved.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC(s)), and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. As a mere example, it should be appreciated that it is conceivable to use or otherwise utilize several (i.e., two or more) second predetermined limits. This way it may for instance be possible to determine different levels of back-pressure, e.g. from low back-pressure to high back-pressure. Also, the back-pressure compensation information indicating a suitable compensation for the back-pressure may be tailored to compensate for said different levels of back-pressure. Likewise, it should be appreciated that it is conceivable to use or otherwise utilize several first predetermined limits. This way it may for instance be possible to determine different levels of congestion, e.g. from low congestion to high congestion. Also, the back-off information indicating the suitable back-off to compensate for the congestion may be tailored to compensate for said different levels of congestion.

Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different embodiments, these may possibly advantageously be combined, and the inclusion of different numbered embodiments does not imply that a combination of features is not feasible and/or advantageous. In addition, singular references do not exclude a plurality.

The invention claimed is:

1. A method of back-pressure control in a transport network, the method being performed by a first network node and comprising:
monitoring a buffer state of a buffer;
determining a condition indicative of congestion in response to a change of the buffer state exceeding a first predetermined limit;
in response to determining the condition indicative of congestion, creating a congestion notification message;
transmitting the congestion notification message to one or more second network nodes;
storing a list of the second network node or nodes to which the congestion notification message has been transmitted;
determining a condition indicative of back-pressure in response to a change of the buffer state passing a second predetermined limit;
in response to determining the condition indicative of back-pressure, creating a back-pressure notification message including a combination of:

a flow identifier identifying a flow that contributes to back-pressure; and back-pressure compensation information indicating a suitable compensation for the back-pressure caused by the flow associated with said flow identifier;

in response to identifying at least one second network node that is currently compensating for congestion based on the stored list, transmitting the back-pressure notification message to the second network node or nodes identified to be currently compensating for congestion, wherein the flow identifier includes at least one of a Packet Data Convergence Protocol (PDCP), Flow Identification (FID), a PDCP Group FID, or a PDCP Multicast Group FID.

2. The method of claim 1, wherein the monitoring comprises:

dynamically sampling the buffer such that a sampling rate is adjusted in dependence of the buffer state.

3. The method of claim 1, wherein the buffer state is a buffer fill level and the change of the buffer state is a change of the buffer fill level, the method further comprising:

monitoring the buffer fill level; and determining the condition indicative of back-pressure in response to the buffer fill level descending below the second predetermined limit.

4. The method of claim 1, wherein the buffer state is a buffer emptying rate at which the buffer empties and the change of the buffer state is a change of the buffer emptying rate, the method comprising:

monitoring the buffer emptying rate at which the buffer state empties; and determining the condition indicative of back-pressure in response to said buffer emptying rate exceeding the second predetermined limit.

5. The method of claim 1, wherein the back-pressure compensation information includes one or more of the following parameters: back-off rate, back-off time, and ramp-up time.

6. The method of claim 1, wherein the flow identifier additionally comprises an Internet Protocol (IP) address associated with the first network node.

7. The method of claim 1, wherein the creating the congestion notification message including a combination of:

said flow identifier identifying a flow that contributes to congestion; and back-off information indicating a suitable back-off to compensate for the congestion caused by the flow associated with said flow identifier.

8. A non-transitory computer-readable medium containing instructions which, when executed on at least one processor, cause a first network node to perform operations for back-pressure control in a transport network comprising:

monitoring a buffer state of a buffer;

determining a condition indicative of congestion in response to a change of the buffer state exceeding a first predetermined limit;

in response to determining the condition indicative of congestion, creating a congestion notification message;

transmitting the congestion notification message to one or more second network nodes;

storing a list of the second network node or nodes to which the congestion notification message has been transmitted;

determining a condition indicative of back-pressure in response to a change of the buffer state passing a second predetermined limit;

in response to determining the condition indicative of back-pressure, creating a back-pressure notification message including a combination of:

a flow identifier identifying a flow that contributes to back-pressure; and back-pressure compensation information indicating a suitable compensation for the back-pressure caused by the flow associated with said flow identifier;

in response to identifying at least one second network node that is currently compensating for congestion based on the stored list, transmitting the back-pressure notification message to the second network node or nodes identified to be currently compensating for congestion, wherein the flow identifier includes at least one of a Packet Data Convergence Protocol (PDCP), Flow Identification (FID), a PDCP Group FID, or a PDCP Multicast Group FID.

9. A first network node for back-pressure control in a transport network, the first network node comprising:

a processor; and a memory containing instructions which, when executed by the processor, cause the first network node to perform operations to:

monitor a buffer state of a buffer;

determine a condition indicative of congestion in response to a change of the buffer state exceeding a first predetermined limit;

in response to determining the condition indicative of congestion, creating a congestion notification message;

transmit the congestion notification message to one or more second network nodes;

store a list of the second network node or nodes to which the congestion notification message has been transmitted;

determine a condition indicative of back-pressure in response to a change of the buffer state passing a second predetermined limit;

create a back-pressure notification message in response to determining the condition indicative of back-pressure, the back-pressure notification message including a combination of:

a flow identifier identifying a flow that contributes to back-pressure; and back-pressure compensation information indicating a suitable compensation for the back-pressure;

in response to identifying at least one second network node that is currently compensating for congestion based on the stored list, transmit the back-pressure notification message to the second network node or nodes identified to be currently compensating for congestion, wherein the flow identifier includes at least one of a Packet Data Conversion Protocol (PDCP), Flow Identification (FID), a PDCP Group FID, or a PDCP Multicast Group FID.

10. The first network node of claim 9, to further perform operations to:

dynamically sample the buffer such that a sampling rate is adjusted in dependence of the buffer state.

11. The first network node of claim 9, wherein the buffer state is a buffer fill level and the change of the buffer state is a change of the buffer fill level, the first network node to further perform operations to:
   monitor the buffer fill level; and
   determine the condition indicative of back-pressure in response to the buffer fill level descending below the second predetermined limit.

12. The first network node of claim 9, wherein the buffer state is a buffer emptying rate at which the buffer empties and the change of the buffer state is a change of the buffer emptying rate, the first network node to further perform operations to:
   monitor the buffer emptying rate at which the buffer state empties; and
   determine the condition indicative of back-pressure in response to said buffer emptying rate exceeding the second predetermined limit.

13. The first network node of claim 9, wherein the back-pressure compensation information includes one or more of the following parameters: back-off rate, back-off time, and ramp-up time.

14. The first network node of claim 9, wherein the flow identifier additionally comprises an Internet Protocol (IP) address associated with the first network node.

15. The first network node of claim 9,
   wherein when creating the congestion notification message in response to determining the condition indicative of congestion, the congestion notification message including a combination of:
      said flow identifier identifying a flow that contributes to congestion; and
      back-off information indicating a suitable back-off to compensate for the congestion caused by the flow associated with said flow identifier.

* * * * *